United States Patent [19]

Frazier

[11] Patent Number: 5,271,271
[45] Date of Patent: Dec. 21, 1993

[54] METHOD AND APPARATUS FOR INSPECTION OF GEARS

[76] Inventor: Charles H. Frazier, P.O. Box 97, Pacific, Wash. 98047

[21] Appl. No.: 680,092

[22] Filed: Apr. 3, 1991

[51] Int. Cl.$^5$ ............................................. G01M 13/02
[52] U.S. Cl. ..................... 73/162; 33/501.9; 33/501.13; 33/501.16; 33/501.19
[58] Field of Search ............ 73/162; 33/501.13, 501.9, 33/501.16, 501.19

[56] References Cited

U.S. PATENT DOCUMENTS

| | | | |
|---|---|---|---|
| 2,318,970 | 5/1943 | Richmond | 33/501.13 |
| 2,815,580 | 12/1957 | Dinger | 33/501.19 |
| 2,856,770 | 10/1958 | Palsson | 33/501.13 |
| 3,337,964 | 8/1967 | Anthony | 33/501.19 |
| 3,461,456 | 8/1969 | Hofler | 346/49 |
| 3,507,049 | 4/1970 | Heldt et al. | 33/179.5 |
| 3,522,524 | 8/1970 | Smith | 324/34 |
| 3,590,491 | 7/1971 | Anthony | 33/501.19 |
| 3,680,373 | 8/1972 | Kearfott | 73/162 |
| 3,693,431 | 9/1972 | King | 73/162 |
| 3,712,000 | 1/1973 | Spear | 51/287 |
| 3,712,130 | 1/1973 | Weichbrodt et al. | 73/162 |
| 3,717,958 | 2/1973 | Ellwanger et al. | 51/26 |
| 3,774,313 | 11/1973 | Occhialini et al. | 33/179.5 B |
| 3,795,143 | 3/1974 | Deprez et al. | 73/162 |
| 3,851,398 | 12/1974 | Hilburger | 33/179.5 B |
| 3,921,304 | 11/1975 | Yagiela | 33/501.19 |
| 3,952,418 | 4/1976 | Akamatsu et al. | 33/174 L |
| 3,992,937 | 11/1976 | Jaeger et al. | 73/162 |
| 4,020,678 | 5/1977 | Laue | 73/67.2 |
| 4,024,757 | 5/1977 | Raess et al. | 73/162 |
| 4,196,620 | 5/1980 | Dapiran | 73/162 |
| 4,252,023 | 2/1981 | Pomernacki | 73/593 |
| 4,261,198 | 4/1981 | Moore | 73/162 |
| 4,272,891 | 6/1981 | Fusari | 33/501.8 |
| 4,325,189 | 4/1982 | Fransson et al. | 33/179.5 B |
| 4,336,711 | 6/1982 | Maehara et al. | 73/162 |
| 4,488,359 | 12/1984 | Misson | 33/501.8 |
| 4,586,373 | 5/1986 | Muller et al. | 73/162 |
| 4,608,862 | 9/1986 | Klukowski et al. | 73/162 |
| 4,610,091 | 9/1986 | Bertz et al. | 33/179.5 R |
| 4,646,566 | 3/1987 | Hofler | 73/162 |
| 4,788,856 | 12/1988 | Felger | 73/118.1 |
| 4,811,490 | 3/1989 | Ueda et al. | 33/179.5 R |
| 4,831,872 | 5/1989 | Huang et al. | 73/162 |
| 4,852,402 | 8/1989 | Bertz | 73/162 |
| 4,872,337 | 10/1989 | Watts et al. | 73/162 |

FOREIGN PATENT DOCUMENTS

| | | | |
|---|---|---|---|
| 0108732 | 7/1982 | Japan | 33/501.16 |
| 0205816 | 9/1986 | Japan | 73/162 |
| 0228290 | 6/1969 | U.S.S.R. | 73/162 |

*Primary Examiner*—William A. Cuchlinski, Jr.
*Assistant Examiner*—Diego F. F. Gutierrez
*Attorney, Agent, or Firm*—R. Reams Goodloe, Jr.

[57] ABSTRACT

Apparatus for manual inspection of gears. The apparatus is particularly useful for determination of helical angle deviation and taper in helical gears. The ear to be inspected is placed in a suitable holder, or on a smooth support surface. A selected master gear segment, manufactured to precise tolerances such that it would perfectly fit an inspected gear that has no error, is brought into meshing engagement with the inspected gear. The selected master gear segment is supported in a working position by a support structure in a manner that the selected master gear segment may be displaced about an axis with respect to a reference datum plane. Support is provided by a pivot pin protruding from the support structure, or alternately by a pivot pin protruding from the gear segment into the support structure. Displacement of the selected master gear is by way of rotation of the gear about the pivot pin, or about both the pin and a ball in the case of a two axis movement type unit which is used for measuring both helical angle deviation and taper. By utilizing a selected master gear segment of known length, the displacement of the measuring surface from the datum plane may be determined by way of a height gage. A suitably positioned dial test indicator is normally utilized to measure the height. The measuring surface further includes a surface of known width for those cases where taper is also measured.

16 Claims, 8 Drawing Sheets

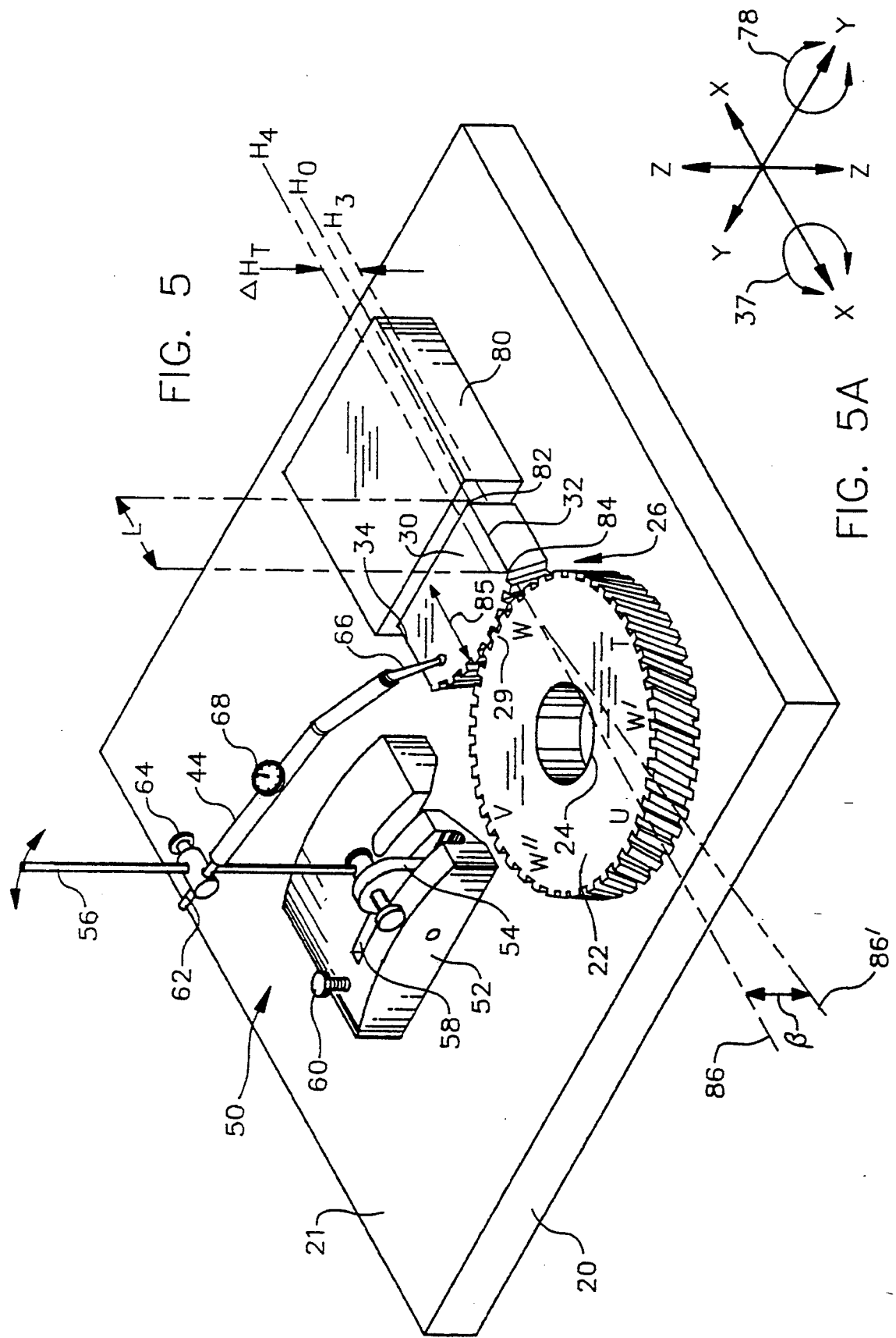

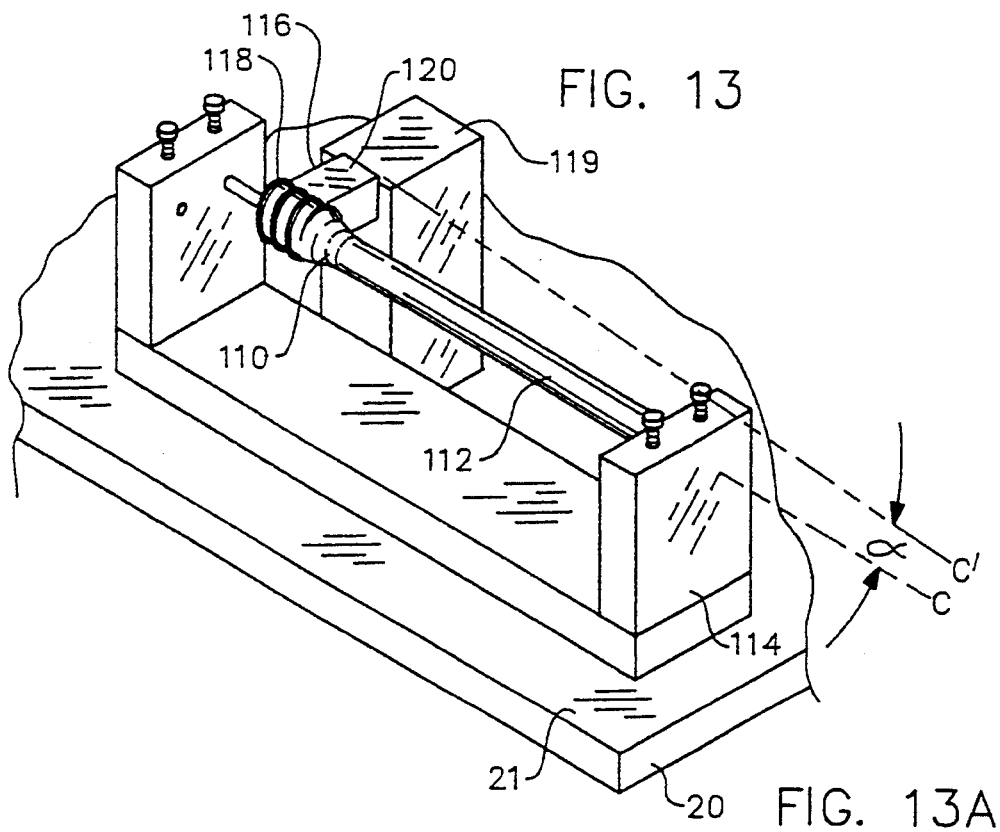
FIG. 13
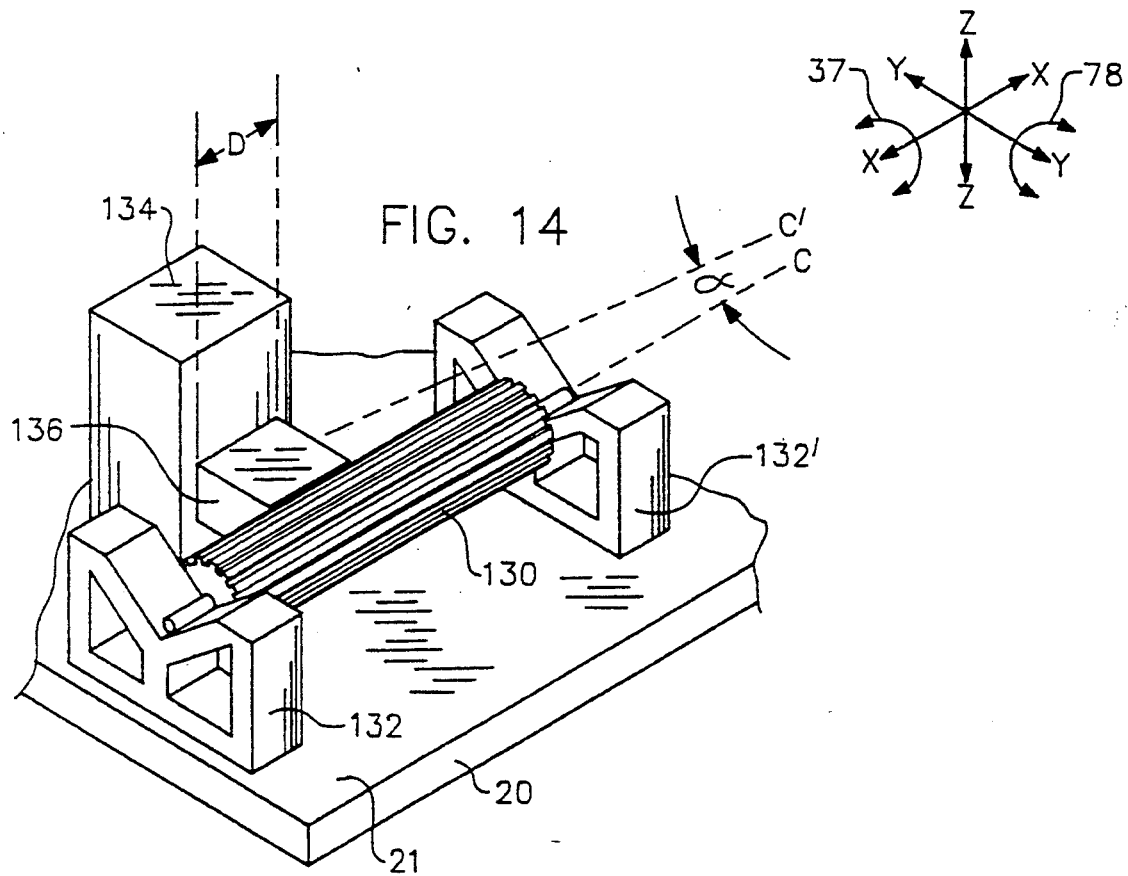
FIG. 13A
FIG. 14

METHOD AND APPARATUS FOR INSPECTION OF GEARS

TECHNICAL FIELD OF THE INVENTION

This invention relates to a method and apparatus for the inspection of gears. More specifically, disclosed and claimed herein is a method for simply and easily determining manufacturing error in gears, and an apparatus for quickly and inexpensively carrying out the inspection method. A primary use of the invention is for the determination of helical angle deviation in helical gears.

BACKGROUND OF THE INVENTION

A wide variety of methods and apparatus are known for inspecting and measuring gears. Determination of variance or error in gears has become a highly refined technology which utilizes very complex electronic, optical, and mechanical methods. As a result, most gears are currently inspected in a sophisticated testing machine. Such machines require substantial capital investment (most machines, in 1991, sell in the range of $75,000 to $175,000), and are generally operated by highly skilled workmen. Quite simply, the sophisticated machinery currently employed for gear inspection is too expensive for many companies to own or lease. Consequently, testing of gears is minimized in order to reduce manufacturing costs. Instead, process control is emphasized, hoping to achieve gear accuracy by control of manufacturing equipment, methods, and processes, without resort to inspection of individual elements of every gear or of every few gears produced. Often, only an initial gear from a production run is closely inspected by modern gear testing apparatus. Subsequent gears, theoretically cut to the same specifications, are often shipped to end users of the product without rigorous inspection of the tolerances. Inspection rates frequently run as low as 1 to 5%. Even when gear inspection is conducted by machine, work must often be shipped to a specialized gear lab, which may take up to several weeks to provide results, at costs running $130 per hour of inspection, or more. Thus, only statistically selected gears from a large production run may be inspected for critical parameters such as the accuracy of the helix on a helical gear. Obviously, the current practice of limited gear inspection greatly increases the chance that improperly fitting or operating gears may be sent out from the manufacturing shop.

The gear inspection apparatus and method of the present invention may be utilized with a variety of gear types, including helical gears, bevel gears, spiral bevel gears, worm gears, or other gear forms where testing may be conducted by utilizing complimentary master gear segments, gear segment holders or support blocks, and measuring devices and indicators as taught herein. However, since this invention is likely to be most often utilized in conjunction with the inspection of helical type gears, some familiarity with the manufacturing processes for such gears will assist the reader in understanding the invention as set forth below.

A helical gear is one in which the individual teeth follow a helix, i.e., surround an imaginary cylinder for some gear face length along the gear axis. If the surface of that cylinder was unrolled and flattened out, the helical gear teeth would form a series of parallel straight lines. The angle between those straight lines and the axis of the gear is the helical angle of the gear.

Helical gears are identified as right-hand or left-hand, depending upon the direction that the helix slopes away from the viewer, when the line of sight is parallel to the axis of the gear. This is important since in order for two helical gears on parallel shafts to mesh, they must be of different hands. As further described below for the present invention, if the measured gear is right hand, then the selected master gear segment utilized to inspect that measured gear must be left hand. Also, it will be recognized that the helix angles of right hand and left hand gears on parallel shafts must be equal.

Helical gears are most often manufactured by utilizing a rotating cutting machine known as a hob or hobbing machine. The hob is actually the cutting tool utilized in the process; the process is accomplished by moving the hob across the gear blank as both the gear blank and the hob are rotated. When helical teeth are cut, the advance of the hob carriage in relationship to the rotation of the gear blank can be adjusted to produce the proper helix angle. Thus, by selection of the proper gear ratio for the hobbing machine drive, the hob is advanced in correct relation to the gear blank so as to cut the specified number of teeth at the correct helical angle. It is important that a gear blank be securely held and that the gear blank be turned precisely at the desired ratio between the advance of the cutter and the axis of the gear. For instance, helical gears mounted on an arbor are more likely to slip when being cut than is a spur gear when it is being cut, because the pressure of the helical cut, being at an angle rather than straight across the gear blank in the direction of the axis (and thus the arbor) as in the case of a spur gear, will tend to rotate the helical gear blank on the arbor. When such slippage occurs, an error in helical angle may result. This error is known as helical angle deviation.

The just described problem which is encountered in the manufacturing of helical gears may result in helical angle deviation for all teeth for a portion across the gear face; in that portion, all teeth would be circumferentially displaced. Also, there may occur a partial dislocation of the entire tooth form. Helical angle deviation is by far the major problem commonly encountered in machining gears.

Helical angle deviation may also be caused by wobble during manufacture, i.e., the gear blank may have been improperly mounted on the gear manufacturing machine, with the result that teeth on portions of the blank were cut at other than the desired helix angles. In addition, helical angle deviation may be caused by improper selection or operation of various gears in the gear cutting machine.

These different kinds of manufacturing problems might result in different kinds of gear defects. For instance, one gear might be manufactured to the wrong helical angle, i.e., it is perfectly made from the standpoint that helical angle is uniform throughout the entire gear, but the actual helical angle is not within the desired specifications. Another problem might be that the gear is satisfactory for most of the revolution but has a portion of the face or a section of the circumference where the helix angle deviates beyond the allowable specification for the particular class of gears. In any event, it is important to discover gear defects as early as possible in the manufacturing process, to reduce costs of rejected parts or from field failure of improperly operating gears.

From the foregoing, it is clear that there is a continuing need for a simple, low cost, quickly executable gear inspection method and for the apparatus to enable semi-skilled or unskilled personnel to confidently, accurately, and reliably carry out the inspection method.

THE PRIOR ART

Gear inspection systems which may have some features resembling those disclosed herein to some remote extent include those disclosed in the following U.S. Pat. Nos.: 3,774,313 issued Nov. 27, 1973 to Occhialini et al. for APPARATUS FOR CHECKING GEAR TEETH AND THEIR ANOMALIES; U.S. Pat. No. 3,851,389 issued Dec. 3 1974 to Hilburger for GEAR TEST APPARATUS; U.S. Pat. No. 3,952,418 issued Apr. 27, 1976 to Akamatsu et al. for MASTER GEAR FOR CHECKING CONTACT; U.S. Pat. No. 4,325,189 APPARATUS FOR CHECKING A GEAR; U.S. Pat. No. 4,608,862 issued Sep. 2, 1986 to Klukowski et al. for SPLINE CHECKING FEATURE; and U.S. Pat. No. 4,831,872 ISSUED May 23, 1989 to Huang et al. for METHOD OF MEASURING GEAR ERRORS THROUGH MESHING AND SEPARATING AND A MACHINE THEREOF.

Occhialini shows the use of a full master gear having three toothed wheels operated on a shaft parallel to that of a working gear being inspected. No provision is made for measuring helical angle per se, nor are mere gear segments utilized.

Hilburger utilizes a full master gear in an operational arrangement to measure the movement of a gear carriage toward and away from a working gear being tested when the gears are meshed and rotated. The device is directed at determining total composite error rather than helical angle deviation.

Akamatsu illustrates the use of a single master gear tooth with electrically conductive detectors to check tooth contact. Akamatsu has no provision for measurement of helical angle deviation. In applications like those of concern to me, the necessity for provision of electrical power and the lack of ability to measure helical angle deviation are significant drawbacks.

Fransson's method and apparatus for inspection of gears obviates the need for operation of an inspected working gear by securing the working gear and rotating the master gear around it. However, Fransson's apparatus has an undesirable degree of complexity, a drawback avoided in the novel apparatus and method disclosed herein by employing a master gear segment and by eliminating the necessity for complete rotation of either part.

The Klukowski patent is concerned with the use of a master spline to determine the accuracy of a gear checking fixture. That spline and the fixture in which it is employed are quite different from, and have none of the advantages of, the gear inspection method and apparatus disclosed and claimed herein.

The Huang method and machine for measuring gear errors requires an undesirably complicated electromechanical apparatus which limits the mobility of the necessary equipment. Furthermore, the Huang apparatus requires a series of specially fabricated master gears with a variety of different tooth features, which, as a consequence, increases the cost when compared to my apparatus and method for inspection of gears.

The devices disclosed in many of the above mentioned patents require significant complicated set up and controls, and thus result in inspection methods which are substantially more complex than I consider desirable, especially from a per unit inspection cost or from a capital equipment requirements standpoint.

In addition to the patents just mentioned, a commonly utilized manual method for gear inspection is the American Gear Manufacturing Associations's (AGMA) standard composite method for gear inspection. That method, further described below, utilizes working gear rotatably mounted on a fixed shaft and a complimentary master gear rotatably mounted on a uniformly biased movable shaft so as to engage and rotate with the working gear while allowing the center to center distances between the gears to vary as the gears are rotated.

It is significant that none of the prior art devices identified above are concerned with the specific problem of providing a simple, low cost apparatus and method for the quick, remote determination of helical angle deviation in gears. This problem is of significant interest to a wide variety of machine shops. Nor do the devices discussed above eliminate the necessity for shipping gears to an inspection shop with equipment capable of defining the error or errors and the concomitant expense. Thus, a continuing need exists for simple gear inspection equipment which can provide a high percentage statistical sample of fully inspected gears at low cost.

SUMMARY OF THE INVENTION

I have developed a simple gear inspection device for inspecting a variety of gear types. The gear to be inspected is placed in a suitable holder, or on a smooth gear support surface, as appropriate for the particular type of gear in which it remains stationary during inspection. A selected master gear segment, manufactured to precise tolerances so that it would perfectly fit in complimentary meshing engagement with a precisely manufactured gear being inspected, is brought into meshing engagement with the inspected gear. The selected master gear segment is supported in a working position by a support structure in a manner that the selected master gear segment may be displaced from a reference datum plane. The means for support of the master gear segment is by way of a pivot pin protruding from the support structure, or of a pin from the gear segment into the support structure, or other convenient means. Displacement of the selected master gear is by way of rotation of the gear about the pivot pin, or about both the pin and a ball in the case of a two axis movement type apparatus which may be used for measuring both helical angle deviation and taper. The selected master gear segment further includes a measuring surface of known length, suitable for determining the displacement of the measuring surface from the datum plane by way of an indicating gage, normally of the dial indicator type. The measuring surface further includes a surface of known width for those cases where taper is also measured.

The apparatus of my invention further comprises the combination of a segment of a master gear segment of a selected diametrical pitch, tooth angle, and finish tolerances within a selected gear classification standard, and a holder or support block adapted to support the selected master gear segment in an operational position. The selected master gear segment is attached to the support block in a manner that the selected master gear segment is free to move with the result that the teeth of the master gear segment are free to align with the teeth of the gear being inspected. When the teeth of the selected master gear segment are in firm meshing engagement with the teeth of the measured gear, a dial test indicator can be traced from a first end to a second end along a measuring surface of known length on the selected master gear segment. From the measurement, a height or distance of the first end and of the second end from a datum plane is determined. If the selected master gear segment aligns with a datum plane parallel to the surface plate or other datum plane in comparison to which the inspected gear is positioned, then the gear being inspected has no error for that particular parameter. However, where displacement of the master gear segment from the datum plane is detected, as indicated by a change in distance of the first end and/or of the second end of the measuring surface from the selected datum plane, the observed change in distances can be converted by mathematical calculations to helical angle deviation or taper, according to the magnitude and direction of measurement. The exact length of the measuring surface of the selected master gear segment is not critical, as long as the length is known precisely. Then, the correct mathematical formula can be utilized to calculate the gear error. However, I have found it convenient to manufacture and utilize selected master gear segments with a measuring surface 5.08 cm (two (2) inches) long and 2.54 cm (one (1) inch) wide. That way, the mathematics are easy for shop personnel to remember and evaluate. Other convenient lengths may be chosen depending upon the gear sizes and measurement systems commonly utilized in a specific location.

My solution to providing a simple, low cost gear inspection device involves the use of a selected master gear segment which is supported by a transportable support block or other holder or support structure. The support structure may also have multiple base planes, wherein the structure may be turned between different base planes so that the selected master gear segment is supported at different positions (lengths or heights along a gear, depending upon orientation), in order that multiple inspections of the gear may be completed without the necessity of moving the gear being inspected to a new position in the support apparatus or on a support plate. The multiple base plane support block might be a simple parallelepiped, or a complex polyhedron. The inspection apparatus thus provided, and the various components therein, are reduced in my design to the barest essential items, which can be manufactured with a minimum of cost and expense. In addition, by use of my inspection technique, excellent inspection accuracy is achieved.

In contrast to gear inspection systems that have heretofore been commercially available, the novel apparatus and methods disclosed herein are adaptable to an easily transportable, rapidly executable, and reliable inspection method. The apparatus and methods are suitable for use by semi-skilled workmen, with resultant low per unit inspection cost. The inspection system of the present invention is uniquely adapted to be utilized in a variety of applications, including some of which have heretofore been difficult to economically justify, such as inspection of each gear manufactured in small production run shops. Further, the method and apparatus of the present invention allows the inspection process to be removed from a remote, specialized quality control area and placed out on the shop floor, adjacent to the gear manufacturing machinery. An operator can be asked to check every part he makes, or a high percentage sample of the parts he makes, so that he is able to achieve consistently high quality gears from his manufacturing equipment. Thus, manufacturing costs can be reduced by way of correcting the manufacturing operations producing out of specification gears before large quantities of rejectable gears are produced.

By way of the present invention, I have developed a novel solution to the problem of high capital costs and operating complexity which are inherent in the heretofore disclosed gear inspection systems of which I am aware. The apparatus of the present invention is free of such disadvantages, due to the simplicity of the apparatus, and of the ease of performing an inspection when utilizing the apparatus, and from the simple mathematical calculations required to complete an inspection report.

In short, I have developed a novel method and apparatus for inspection of gears, particularly for helical gears. The novel inspection apparatus includes a unique multi-base support block which simplifies the inspection of a single gear at multiple gear face positions. In addition, my method accomplishes the inspection process without the need for complex, expensive measurement equipment.

OBJECTS, FEATURES, AND ADVANTAGES OF THE INVENTION

It is an object of the present invention to provide an inspection apparatus whereby much of the equipment normally associated with inspection of gears can be eliminated altogether.

It is also an object of the present invention to provide a gear inspection system which is simple and inexpensive to manufacture.

It is yet another object of the present invention to provide a device which is light and portable so that gear inspection can be easily performed wherever desired.

It is still another object of the present invention to provide a device and method which is easy for semi-skilled workers to utilize for the purpose of measuring as many gears as desired and rejecting those gears that exceed the maximum allowable deviation from specifications, such as may be established by a plant quality control or engineering department.

It is an important feature of the present invention that capital equipment costs are virtually eliminated when compared to conventional gear inspection equipment.

It is an important and primary feature of the present invention that it is easy and simple to operate, eliminating the need for highly trained inspection personnel.

It is an important advantage of my invention that semi-skilled workers can conduct quality control inspections which can be more frequently and cost effectively completed so as to assist in reducing manufacturing defects.

It is yet another important advantage that increased gear inspection rates may be provided at minimal cost, which dramatically decreases the number of defective or out of specification gears shipped from a manufacturing shop.

Another related and significant advantage of my invention is that it eliminates the necessity for regular offsite shipment of gears for inspection, thus dramatically reducing the lost production time commonly encountered when utilizing conventional gear inspection systems.

Additional objects, advantages, and novel features of the invention will be set forth in the detailed description of the invention which follows, or may become apparent to the reader from the appended claims and accompanying drawings, or may be learned by practice of the invention. The objects and advantages of the invention may be realized and attained by means of the instrumentalities and combinations particularly pointed out in the appended claims, or by their equivalents.

BRIEF DESCRIPTION OF THE DRAWINGS

My invention may be more clearly understood by reference to the accompanying drawings thereof, wherein:

FIG. 5 is a perspective view of the various parts of the present invention, similar to the view first show in FIG. 2, together with a workpiece gear being inspected, as well as the ancillary measuring equipment, all assembled in working relation, illustrating the measurement of taper.

FIG. 5A is a key to describe the orientation of parts and the direction of rotation or movement of the items depicted in FIG. 5.

FIG. 7 is an isometric view of a support block with a selected master gear segment, shown with the support block turned to locate the pivot pin at a low position.

FIG. 8 is a side view of the support block and selected master gear segment first illustrated in FIG. 7, now shown in working relation to a long face left hand helical gear, so that the helical angle deviation of the long face left hand helical gear may be determined at a first position.

FIG. 9 is an isometric view of a support block with a selected master gear segment, shown with the support block turned to locate the pivot pin at an intermediate position.

FIG. 10 is a side view of the support block and selected master gear segment just illustrated in FIG. 9, now shown in working relation to the long face left hand helical gear first shown in FIG. 8, so that the helical angle deviation of the left hand helical gear may be determined at an intermediate position.

FIG. 11 is an isometric view of a support block with a selected master gear segment, shown with the support block turned to locate the pivot pin at an upper position.

FIG. 12 is a side view of the support block and selected master gear segment just illustrated in FIG. 11, now shown in working relation to the long face left hand helical gear first shown in FIG. 8, illustrating the determination of the helical angle deviation of the left hand helical gear at a third position.

FIG. 13 is a perspective view of the various parts of the apparatus of the present invention assembled in working relation with a workpiece worm gear being inspected, illustrating measurement of helical angle deviation of the worm gear.

FIG. 13A is a key to describe the orientation of parts and the direction of rotation or movement of the items depicted in FIG. 13.

FIG. 14 is a perspective view of the various parts of the present invention assembled in working relationship with a spline gear being inspected, illustrating measurement of spline helix allowance.

FIG. 15A is a key to describe the orientation of parts and the direction of rotation or movement of the items depicted in FIG. 15.

DETAILED DESCRIPTION OF THE INVENTION

Figure 1:
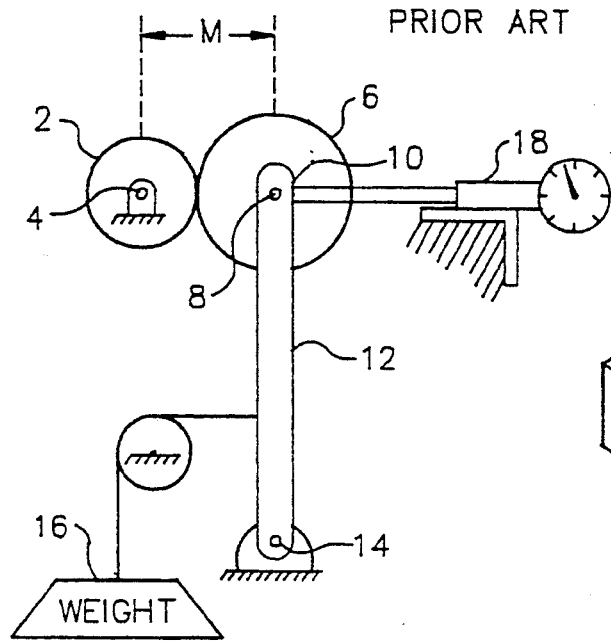
FIG. 1 is a schematic of a prior art manual gear inspection method as described by the American Gear Manufacturing Association.

Referring first to FIG. 1, for purposes of comparison of the present invention to apparatus and methods heretofore utilized, a prior art apparatus commonly used in the composite method of gear inspection is shown. This apparatus is that taught by the American Gear Manufacturing Association and referred to above. An understanding of the apparatus will help the reader appreciate the advance provided by the present invention over one of the most commonly utilized prior art manual gear inspection methods.

A working gear 2 to be inspected is rotatably mounted on a fixed shaft 4. A master gear 6 of known specifications and quality standards is rotatably mounted on a shaft 8 fixed at the floating or movable end 10 of lever arm 12 at a position which enables the master gear 6 to be brought into firm meshing engagement with working gear 2. The lever arm 12 is rotatably mounted about fixed shaft 14 and is biased by means such as weight 16 or a spring (not shown) so as to urge the master gear 6 toward working gear 2 with uniform force as the master gear 6 is rotated about shaft 8. A dial indicator 18 is situated so as to accurately measure the change in meshing center distance M (i.e., the change in the sum of the radii of working gear 2 and master gear 6) as the gears are rotated. The method provides an indication of problems with the accuracy of helical angle in a particular working gear 2 by way of change in meshing center distance M, or by way of simple inoperability in severe cases, but does not enable the gear inspector to directly determine the actual helical angle deviation for a particular gear tooth or at a particular location along a gear face. This prior art device records deviations of helix angle, wobble, and lack of concentricity to axis as a variation of center to center distance, without being definitive or specific as to the causative factor of the defect.

Figure 2:
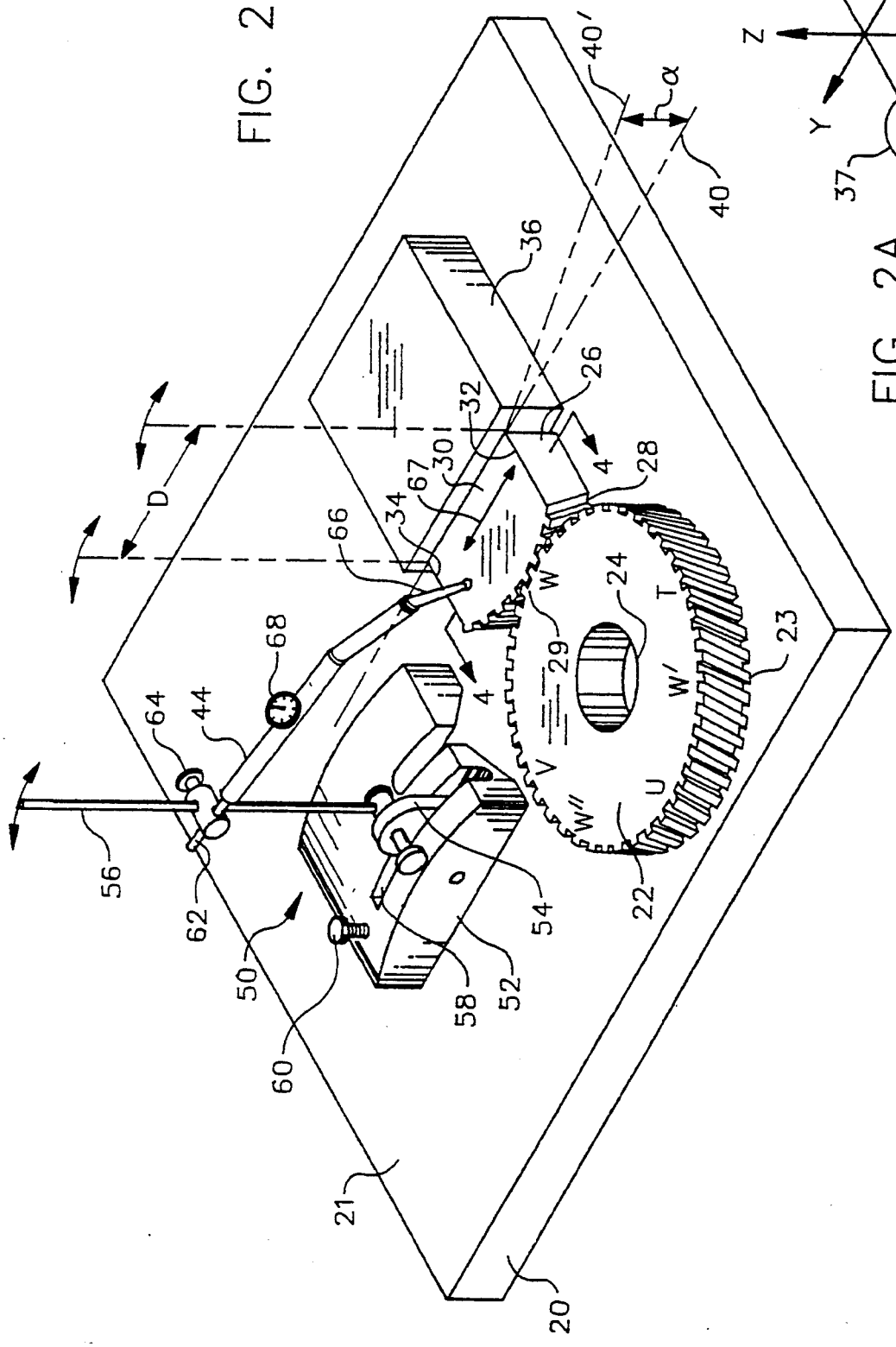
FIG. 2 is a perspective view of the various parts of the present invention, together with a workpiece gear being inspected, as well as the ancillary measuring equipment, all assembled in working relation, illustrating measurement of helical angle deviation.

Attention is now directed to FIG. 2, where the apparatus and method of my invention is illustrated. A surface plate 20 is utilized to provide a highly smooth, uniformly finished surface from which comparison of vertical distance or height above such surface can be accurately measured. The surface plate 20 may be any of the commonly utilized surfaces, such as a good quality cast surface, a granite surface plate, or a glass surface plate. The latter types have the advantage of not rusting and do not bur. Although I prefer the smoothly polished granite surface, any smooth surface which meets grade "B" or "C" surface finish and flatness according to the U.S. National Bureau of Standards classifications is appropriate for a surface plate 20.

Figure 2A:
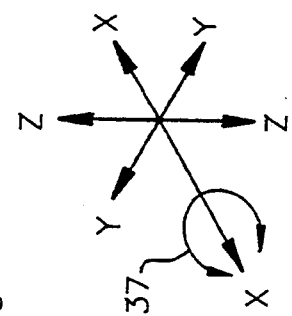
FIG. 2A is a key to describe the orientation of parts and the direction of rotation or movement of the items depicted in FIG. 2.

Resting on surface plate 20 is a right hand helical gear 22, to be inspected, having teeth 23 and a center bore 24. As clearly indicated in the drawings, the gear 22 remains stationary during inspection. A selected master gear segment 26 having preinspect gears 28 of known diametrical pitch, a known helical angle, and finished to a gear class of standard industrial acceptance is placed in firm meshing engagement with the helical gear 22. The selected master gear segment has a first measuring surface 30, with a first end 32, a second end 34, and having a length D. Supporting the selected master gear segment 26 is a master gear segment holder or support block 36. Various embodiments for a connection means between the support block 36 and the selected master gear segment 26 are illustrated other figures below. However, it should be noted that the support block 36 and the later described connection means to the selected master gear segment 26 act to allow the selected master gear segment 26 to pivot about at least one axis (illustrated by arrow 37 around an X-axis in the key shown in FIG. 2A) so that the said first end 32 and second end 34 are free to rotate upward or downward as the master gear segment 26 and helical gear 22 are brought into firm meshing engagement. The rotation (if any) ends when selected gears 28 of the master gear segment 26 are in firm meshing engagement with the adjacent tooth 29 of the measured helical gear 22. When exactly complimentary helix angles are selected for the left hand helical selected master gear segment 26 and the right hand helical gear 22 being inspected, there will be no rotation of the gear segment 26 when the inspected gear tooth 29 has no helical angle deviation. When there is helical angle deviation of a measured tooth 29 of gear 22, rotation of gear segment 26 will occur, with resultant differential heights of first end 32 and second end 34 above the datum plane provided by the surface plate 20. For purposes of illustration, a second datum plane is show by reference line 40 extending from the upper measuring surface 30 of gear segment 26 while at an assumed neutral position parallel to the surface plate 20. The aforementioned rotational displacement of gear segment 26 results in a new reference line 40' when the gear segment 26 is firmly seated in meshing engagement with helical gear 22. This new reference line 40' may be in either a positive or negative direction (here shown positive or in an upward direction for a first end 32 displaced upward). The difference between the neutral datum plane reference line 40 and the displaced reference line 40' is the helical angle deviation alpha ($\alpha$) of gear 22, at the measured tooth 29 at position W on the gear. To allow better understanding of the method, later in FIG. 4 a more precise depiction of the position of reference lines 40 and 40' is provided.

In my method, the helical angle deviation alpha ($\alpha$) is determined mathematically by use of data obtained regarding the differential elevation between first end 32 and second end 34 of selected master gear segment 26. This is possible because the master gear segment 26 has a known length D between the first end 32 and the second end 34 of the first measuring surface 30. Therefore, a simple trigonometric formula is employed to determine the measured helical angle deviation alpha ($\alpha$).

A convenient instrument for conducting the required differential measurements is a dial test indicator 44. An instrument with discrimination in the 0.00254 mm (0.0001 inch) range is most desirable. Here, a standard surface gage 50 has been adapted to hold the dial test indicator 44. The surface gage 50 has a precision base 52, which supports the rocker arm 54. Attached to rocker arm 54 is a spindle 56 which moves forward and backward along the axis of slot 58 as adjusting screw 60 is turned. The scriber 62 is adjustably mounted to spindle 56 via an adjustable friction latch 64 so that the location of scriber 62 can be adjusted vertically (along Z axis). It is desirable to set the scriber 62 so that the dial test indicator 44 can be moved approximately parallel to the measuring surface 30, to eliminate measurement error. Here, the dial test indicator 44 is slidably attached to the scriber 62, so the the measuring tip 66 of the dial test indicator 44 can be traced from the first end 32 to the second end 34 of measuring surface 30 of the gear segment 26.

The measuring tip 66 of the dial test indicator 44 can be swiveled or moved to any desired test position. Various types of dial test indicators are known, including both balanced indicators (having both positive and negative reading gages from a zero point) and continuous indicator gages (having only readings in one direction from zero). Those skilled in the art can readily adapt the teachings herein to use of the type of indicator they may have available. As with any linear measurement instrument, it is important to align the axis of the trace of the dial test indicator with the axis of the measurement to avoid error.

To make the required measurement, set the dial test indicator tip 66 to the first end 32 of the measuring surface 30 of the selected master gear segment 26, and adjust the indicator gage 68 until it reads zero when the measuring tip 66 is in contact with the measuring surface 30. Then, trace the tip 66 of the dial test indicator 44 along a selected direction, here indicated by arrow 67 along the measurement surface 30, stopping when the second end 34 of the measuring surface 30 is reached. The height differential between the first end 32 and the second end 34 of the measuring surface 30 is then read from the dial gage 68.

It will be understood by those familiar with measurement equipment in the machine industries that other means to measure the height differential between a first end 32 and a second end 34 of the selected master gear segment 26, such as a precision height gage, optical height gage, or one of various types of comparators, such as a dial indicator comparator or an electronic comparator, may be employed when utilizing the apparatus and method of the present invention. However, since one of the primary objectives of the present invention is to minimize the equipment required for testing, one of the easiest tools to use, the dial test indicator 44, was chosen for use in the description herein.

Normally, an inspection will be conducted on various parts of a gear 22 to determine that it is true for all parts of the revolution. A typical procedure would be to take three measurements spaced apart by 120° so that each major region has the opportunity to be inspected. For example, in FIG. 1, inspections could be made by turning helical gear 22 so that a measurement could be taken along the gears at W, then again at W', and then again at W''. For closer inspections, four measurements may be taken, for each 90° of arc, for example, adjacent to the one positions marked T, U, V, and W. Either type of procedure will help identify and eliminate a quality problem which is quite frustrating to assembly personnel, namely that a gear which is visually satisfactory, and which functions fine for part of a revolution, fails to function at another region because it binds up with its mating gear. Such a problem may have originated in gear manufacturing for various reasons, such as slipping or wobbling while being cut, with the result that the produced gear may have a greater than specification helix angle at some parts, and a smaller than specification helix angle at other parts. Either of such problems, or other problems, may result in the clearance and operability problems just mentioned.

It is clear that my apparatus does not require extensive facilities for set up or utilization. All that is required is a smooth precision measuring surface and a height gage. No power source is required. However, it may be desirable to provide electronic and or computer hookup to the height gage for recording of measurements.

Referring now to FIGS. 3 through 22, in many cases the components of the novel gear inspection system illustrated in those figures and embodying the principles of my invention are essentially duplicates of those shown in FIG. 2. To the extent that this is true, like reference characters have been employed for like purposes.

Figure 3:
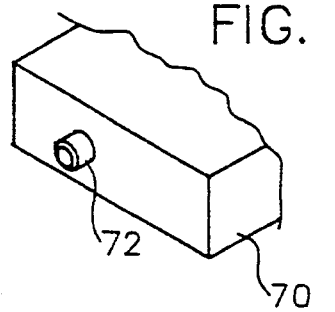
FIG. 3 is a perspective view of a support block showing a pivot pin, similar to the support block first illustrated in FIG. 2.

FIG. 3 is a perspective view of a support block 70, similar to the support block first illustrated in FIG. 2, showing a pivot pin 72. Like the embodiment first shown in FIG. 2, pivot pin 72 is configured to insert into a receiving chamber 74 (shown in FIG. 4) in master gear segment 26, in a snug (as little play as possible) yet freely moveable operable arrangement. The master gear segment 26 (see FIG. 4) is thereby free to rotate about pivot pin 72.

Figure 4:
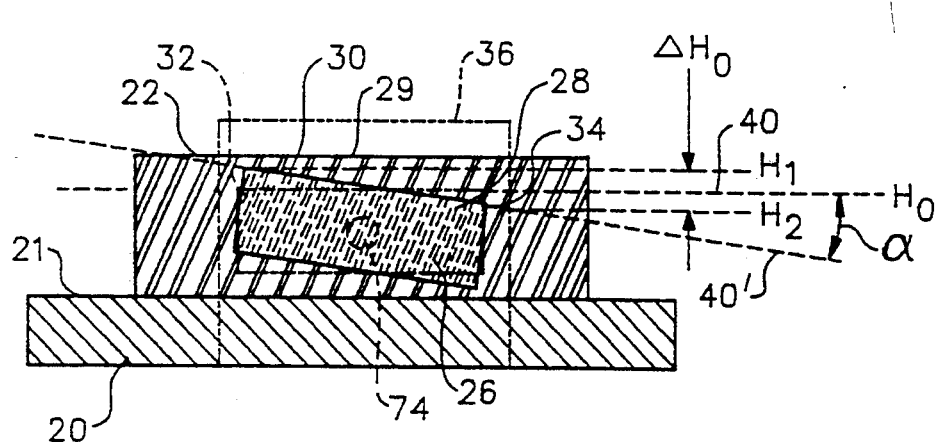
FIG. 4 is a simulated cross-sectional view illustrated as if taken along lines 4—4 in FIG. 2, showing a selected master gear segment in a working position engaged with a gear being inspected, with somewhat exaggerated deviation angle indicated so as to assist in an understanding of the method of the present invention.

FIG. 4 is a simulated cross-sectional view illustrated as if taken along lines 4—4 in FIG. 2, showing a selected master gear segment 26 in a working position engaged with a gear 22 being inspected, with somewhat exaggerated helical deviation angle alpha ($\alpha$) indicated so as to assist the reader in gaining an understanding of the method of the present invention. Surface plate 20, having a smooth upper measuring surface 21, supports gear 22. Tooth 29 of gear 22 is firmly engaged in meshing contact with gear segment 28. Chamber 74, adapted to receive pivot pin 72, is shown. A height $H^o$ is shown for the measuring surface 30 of gear segment 26 when in the free position with the surface 30 parallel to surface plate 20's upper measuring surface 21. When gear segment 26 is engaged with gear 22, first end 32 is displaced upward to a level indicated by $H^1$. The second end 34 is displaced downward to a level indicated by $H^2$. The distance desired to be measured in the present invention is the difference between $H^1$ and $H^2$, or delta HD (delta H-deviation). Since the upper measuring surface 30 of gear segment 26 has a known length D (for ease of calculation, I have utilized a standard of 5.08 cm (exactly two (2) inches). However, any known length is acceptable. The helical angle deviation alpha ($\alpha$) can then be easily calculated. Alternately, the necessity for calculation of helical angle deviation may be avoided by utilizing the lead tolerance method of determining acceptability of gears, as further described herein below.

Besides the helical angle deviation problem just discussed, another problem commonly encountered in gear manufacturing is undesired taper. Conceptually, taper is the tendency of a gear segment to be cone shaped rather than cylindrically shaped over the gear face. Taper is the slope of a line which represents the variation in diameter along the gear axis. Determination of taper is also an important cross check when finding or checking for wobble, as taper must also exist when there is a wobble in a helical gear.

My invention is also novel with respect to the apparatus and method utilized to detect taper. Referring now to FIG. 5 a perspective view similar to the view first shown in FIG. 2 is provided. FIG. 5 shows a workpiece gear 22 being inspected, my apparatus, and the ancillary measuring equipment, all assembled in working relation. However, in this FIG. 5, the selected master gear segment 26 is allowed to move in a direction 90° from that illustrated in FIG. 2, where helical angle deviation alone was measured.

To allow movement in about the Y-axis as indicated by arrow 78 in the key shown in FIG. 5A, there must be provided a different type of means to connect master gear segment 26 and support block 80 than is provided in FIGS. 2 and 3, where rotation about an X-axis only is provided. One such connection means to allow rotation about both the X-axis and the Y-axis is illustrated in FIG. 6; other suitable apparatus are illustrated in FIGS. 18–22 below.

Measuring surface 30 is provided with a third end 82 and a fourth end 84, separated by a known length L. For most measurements, I have found it convenient to use a dimension of 2.54 cm (exactly one (1) inch) for L, although any exactly known length will suffice. In a manner similar to that illustrated in detail in FIG. 4 above, those skilled in the art will readily recognize that the third end 82 will move up or down in the Z-axis direction to a new location $H^3$, and that fourth end 84 will move opposite to end 82 to a new location $H^4$. Then, the dial test indicator 44 can be utilized to trace in the direction indicated by arrow 85, to measure the elevation difference between $H^3$ and $H^4$, or delta $H_T$ (delta H-taper). The taper is represented by the angle beta between the reference datum plane line 86, parallel to surface plate top 21 when the gear segment 26 is in a neutral, no taper position, and reference line 86', parallel to measuring surface 30 when gear segment 26 is in firm meshing engagement with gear 22. After measurement of delta $H_T$, and given the known length L of gear segment 26, the taper angle beta ($\beta$) can be calculated. Then, the result can be compared to the desired gear standards table to determine whether or not the gear 22 is within the desired taper specification.

Figure 6:
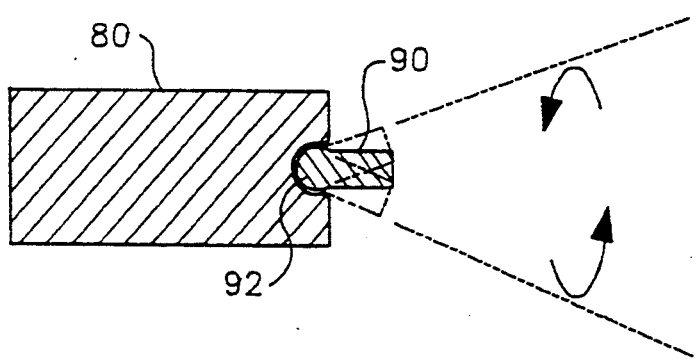
FIG. 6 is a sectional view of an alternate embodiment of a support block with two axis pivot pin, as utilized in the apparatus first illustrated in FIG. 5

FIG. 6 is a cross sectional view of an alternate embodiment of a support block such as may be utilized in block 80 of FIG. 5 to provide a two axis movement pivot pin connection means 90 (in direction 37 about the X-axis, or in direction 78 about the Y-axis). This type of arrangement provides for the ability to measure both helical angle deviation and taper with the same apparatus, i.e. that apparatus consisting of support block 80, connection means 90, and selected master gear segment 26, together with ancillary measuring equipment.

Here, the two axis movement pivot pin connection means 90 is illustrated by utilizing a ball and socket type joint 92. Hence, the selected master gear segment 26 can rotate upward or downward about both the X-axis and about the Y-axis.

FIGS. 7 through 12 are related in that a sequence of steps are shown to measure helical angle deviation of a single long face left hand helical gear 91 at various points along the gear face, utilizing the same support block and selected master gear segment. It can be seen that the support block 92 is provided with a pivot pin 94 in an offset location in order to achieve the sequence illustrated in FIGS. 7 through 12. One convenient support block configuration is to provide a rectangular polygon block of dimensions height D, width E, and length F, where D and E are 3.81 cm (one and one-half (1.5) inches), and F is 7.62 cm (three (3) inches). Then, pivot pin 94 can be centered between the sides D and D,, but located off-center between E and E'. A convenient setup which has been utilized is to center pivot pin 94 at 1.27 cm (one-half (0.5) inch) upward from E, and 1.905 cm (three-quarters (0.75) inches) from each of D and D As block 92 is rotated, it can be seen how sides F, F', F" and F''' rotate to move pivot pin 94 to different elevations for support of a selected master gear segment 26. This type of arrangement is not limited to use of a rectangular support block 92, indeed, the concept may be extended to any polyhedral support block wherein by turning the block, different pivot pin 94 or other similar connection means as may be described herein below may be utilized to place gear segment 26 at a desired test location against the gear 91 to be tested.

Figure 7:
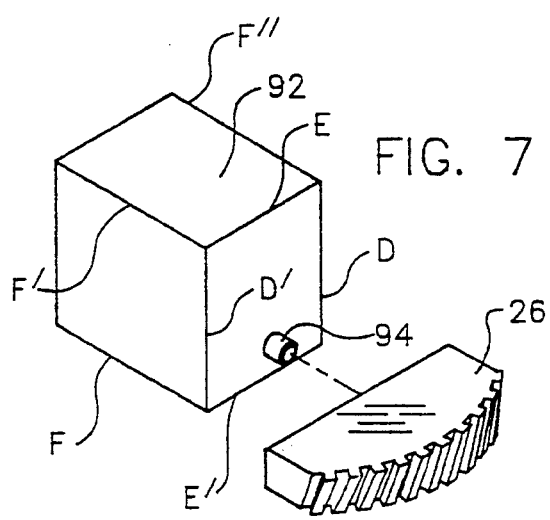
FIGS. 7 through 12 are related in that a sequence of steps are shown to measure helical angle deviation of a single long face left hand helical gear at various points along the gear face, utilizing the same support block and selected master gear segment.

FIG. 7 is an isometric view of a support block 92 with a selected master gear segment 26, shown with the support block turned to locate the pivot pin 94 at a low position, so that gear segment 26 may be disposed near a support plate 20 (not shown).

Figure 8:
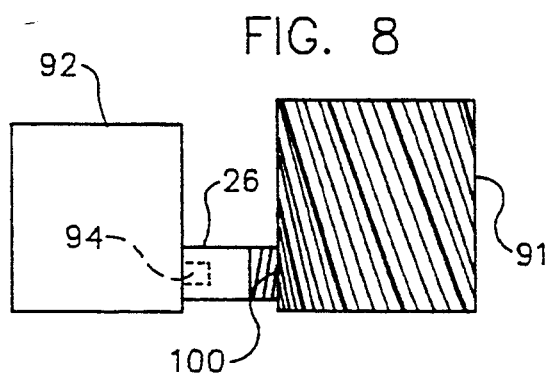

FIG. 8 is a side view of the support block 92 and selected master gear segment 26 first illustrated in FIG. 7, now shown in working relation to a long face left hand helical gear 91, so that the helical angle deviation and/or taper of the left hand helical gear 91 may be determined at a first position 100.

Figure 9:
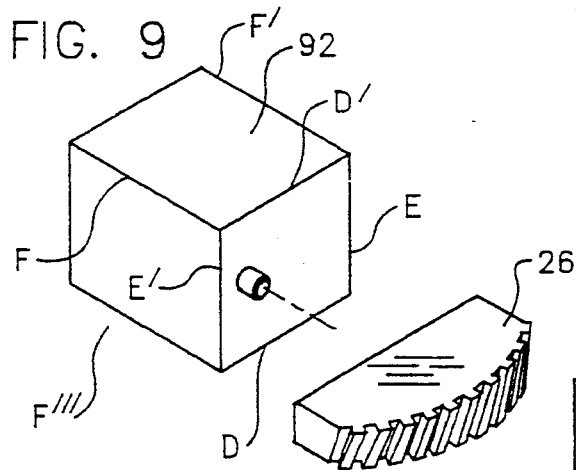

FIG. 9 is an isometric view of a support block 92 with a selected master gear segment 26, shown with the support block turned to locate the pivot pin 94 at an intermediate position.

Figure 10:
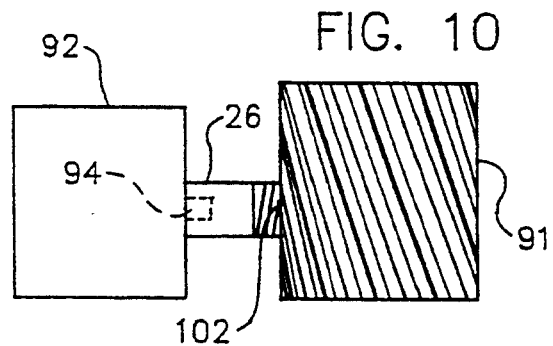

FIG. 10 is a side view of the support block 92 and selected master gear segment 26 first illustrated in FIG. 7, now shown in working relation to the long face left hand helical gear 91 first shown in FIG. 8, so that the helical angle deviation or taper of the left hand helical gear 91 may be determined at a second position 102.

Figure 11:
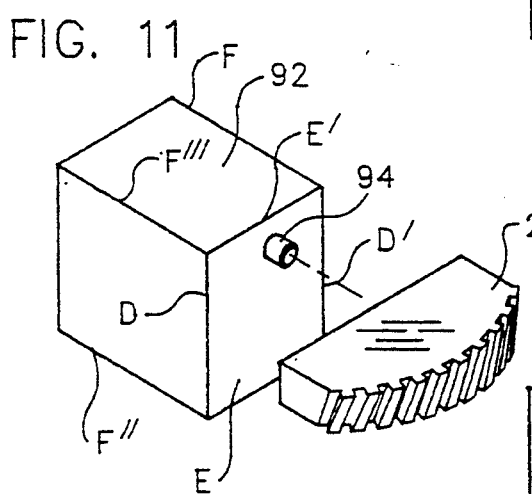

FIG. 11 is an isometric view of a support block 92 with a selected master gear segment 26, shown with the support block 92 turned to locate the pivot pin 94 at an upper position.

Figure 12:
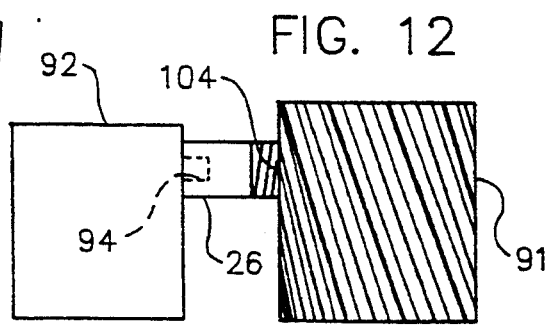

FIG. 12 is a side view of the support block 92 and selected master gear segment 26 illustrated in FIGS. 7 through FIG. 11, now shown in working relation to the long face left hand helical gear 91 illustrating the determination of the helical angle deviation or of taper of the measured left hand helical gear 91 at a third position 104.

Turning now to FIG. 13, there is shown a perspective view of the various parts of the apparatus of the present invention assembled in working relation to inspect workpiece worm gear 110 on shaft 112. Alignment apparatus 114 supports the shaft 112 on centerline C, parallel to the upper surface 21 of support place 20. In the case of the worm gear 110 being inspected, a complementary selected master gear segment 116 is fitted in firm meshing engagement with teeth 118 of worm gear 110. The gear segment 116 is supported by support block 119. Measuring surface 120 of master gear segment 116 is tilted slightly in the event that helical angle deviation or taper are present, and measurements are taken as generally detailed above. More particularly, helical angle deviation will result in rotation of gear segment 116 about the X-axis as indicated by arrow 37 shown in FIG. 13A, and taper will result in rotation about the Y-axis as indicated by arrow 78.

It will be recognized by those skilled in the art that the alignment apparatus 114 could also be utilized to hold a helical gear mounted on a shaft. In such a case the various directions of rotation resultant from helical angle deviation or taper error, and the required measurements, can be made as if the examples of FIG. 2 and FIG. 5 were simply stood on edge. In such a case, helical angle deviation would be measured by measuring Y-axis variation along a vertical or Z-axis trace of pin 66 of dial test indicator 44 along measuring surface 120. Taper would be measured as Z-axis variation along the X-axis (front to back or vice versa path) i.e., in the direction between the gear and the support block. Such a set of measurements is an excellent application for the method and apparatus of the present invention.

FIG. 14 is a perspective view of the various parts of the present invention assembled in working relationship with a spline gear 130 being inspected, illustrating measurement for spline helix allowance. The spline gear 130 is supported above surface plate 20 so that the centerline of gear 130 is parallel to upper surface 21 of plate 20. A pair of matching V-blocks 132 and 132' are shown supporting gear 130. Support block 134 supports master gear segment 136 in a testing position in firm meshing engagement with gear 130. The various measurements are as generally described above and need not be further detailed.

Figure 15:
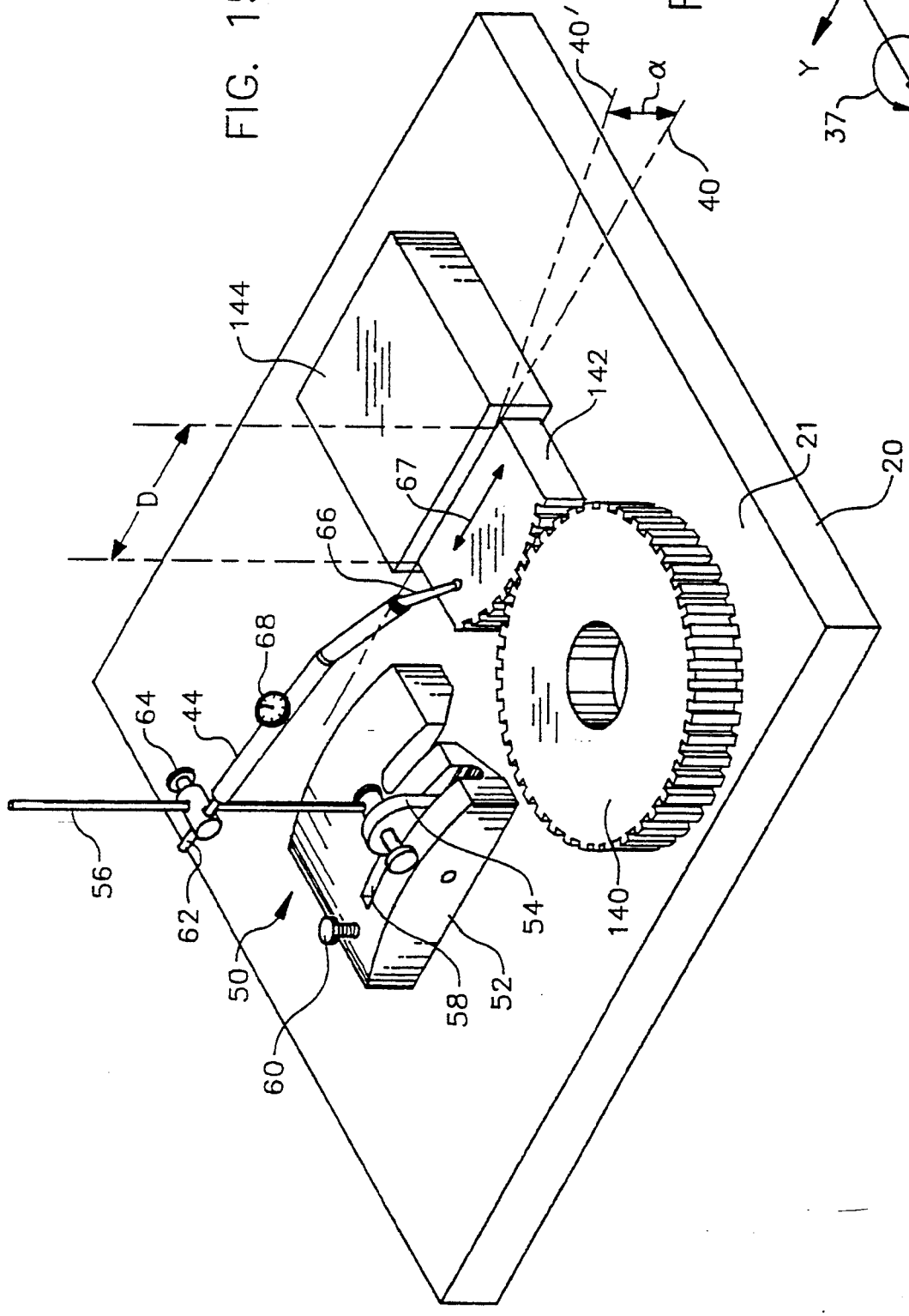
FIG. 15 is a perspective view similar to FIG. 2, showing the apparatus and method of the present invention and including a spur gear workpiece being inspected, as well as the ancillary measuring equipment, all assembled in working relation in a position to measure spur gear helix allowance.

Turning now to FIG. 15, a perspective view similar to that shown in FIGS. 2 or 5 is provided, showing the various parts of apparatus of the present invention as well as ancillary apparatus necessary to execute the method. A spur gear 140 workpiece is being inspected, utilizing a selected master gear segment 142 complimentary to the spur gear 140. A rectangular support block 144 is utilized to position spur master gear 142. The reference lines indicate measurement of helical allowance in a manner similar to that shown for helical deviation in FIG. 2 above, as will be readily appreciated by those familiar with such measurements. Taper can also be measured by the present apparatus when examining spur gear 140.

FIGS. 16 through 22 illustrate various types of connecting means which may be utilized to connect a support block such as block 150 with a selected master gear segment such as gear segment 152 in order to conduct the measurements as taught herein.

Figure 16:
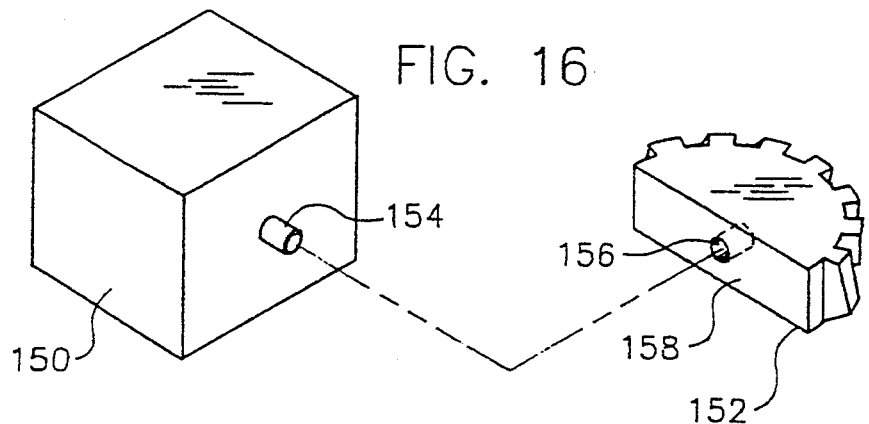
FIG. 16 is a split isometric view showing one embodiment of the present invention where a single axis pivot pin extending from a support block inserts into a chamber in the selected master gear segment.

FIG. 16 is a split isometric view showing one embodiment of the present invention where a single axis pivot pin 154 extending from a support block 150 inserts into a chamber 156 housed by the body 158 of the selected master gear segment 152.

Figure 17:
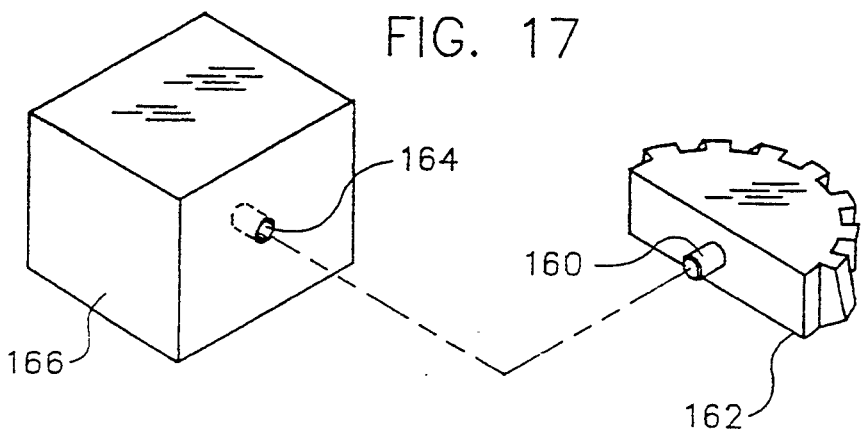
FIG. 17 is a split isometric view showing another embodiment of the present invention where a single axis pivot pin extending from the selected master gear segment inserts into a chamber in the support block.

FIG. 17 is a split isometric view showing another embodiment of the present invention where a single axis pivot pin 160 extending from the selected master gear segment 162 inserts into a chamber 164 housed by the support block 166.

Figure 18:
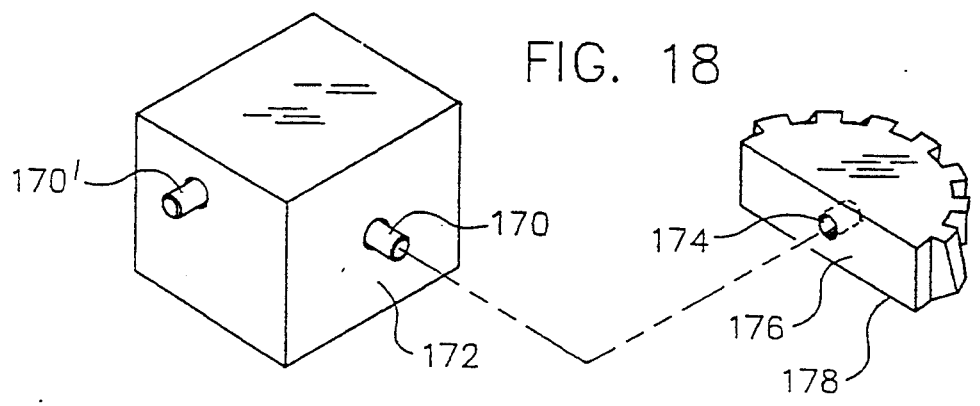
FIG. 18 is a split isometric view showing another embodiment of the present invention where a two axis pivot pin extending from a support block inserts into a chamber in the selected master gear segment.

FIG. 18 is a split isometric view showing another embodiment of the present invention where a two axis pivot pin 170 or 170' extending from a support block 172 inserts into a chamber 174 housed by the body 176 of selected master gear segment 178.

Figure 19:
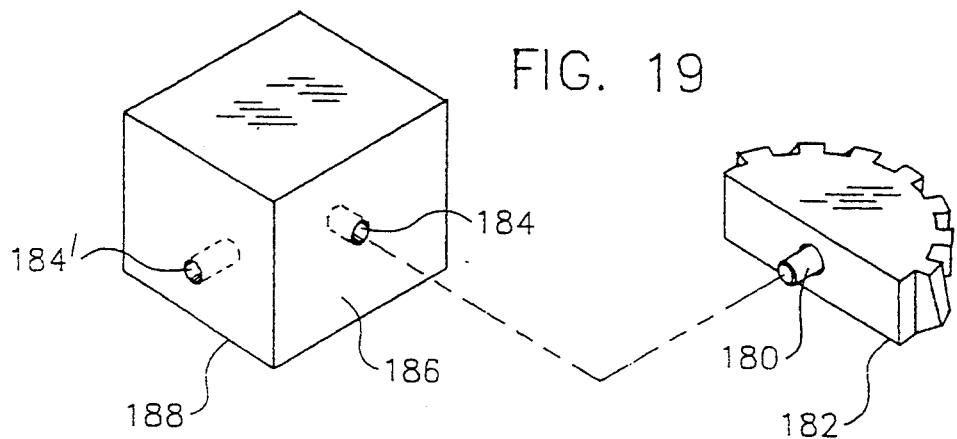
FIG. 19 is a split isometric view showing another embodiment of the present invention where a two axis pivot pin extending from a selected master gear segment inserts into a chamber in the body of the support block.

FIG. 19 is a split isometric view showing another embodiment of the present invention where a two axis pivot pin 180 extending from a selected master gear segment 182 inserts into a chamber 184 or 184' housed in the body 186 of support block 188.

Two axis pivot pins 170 or 180 may be constructed with a ball and socket type joint 92 as first illustrated in FIG. 6 above, or may utilize other types of joints to achieve similar movement of a selected master gear segment relative to a working gear being examined so as to enable the user to practice the methods described herein.

Figure 20:
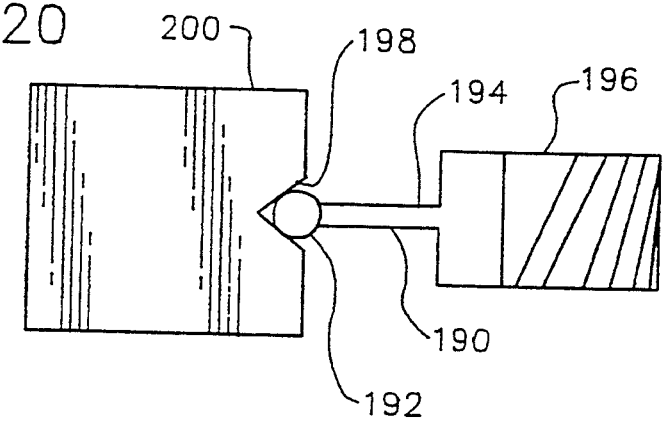
FIG. 20 is a side view showing another embodiment of the present invention where a pivot ball and pin extending from the selected master gear segment inserts into V-shaped slot in the support block.

Referring now to FIG. 20, a side view is provided of another embodiment of the present invention where connection means 190 comprising a pivot ball 192 and pin 194 supporting the ball 192 are rigidly affixed to a right hand master gear segment 196. The connection means 190 extends from the master gear segment 196 and inserts into a preferably V-shaped slot 198 in the support block 200. Ball 192 minimizes contact with block 200 and allows gear segment 196 to move freely in relation to a working gear (not shown) which is being measured.

Figure 21:
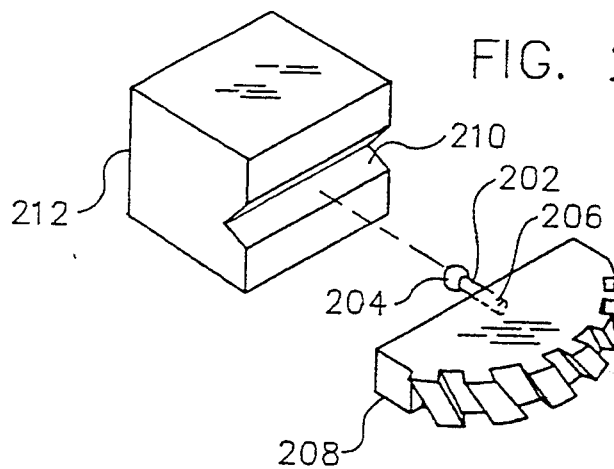
FIG. 21 is an isometric view showing another embodiment of the present invention where a two axis movement pivot ball and pin extending from a master gear segment inserts into a V-shaped slot in the support block.

FIG. 21 is an isometric view showing a two axis movement connection means 202 comprising a pivot ball 204 and pin 206 extend from left hand master gear segment 208. Similar to the view first shown in FIG. 20, pivot ball 204 into a V-shaped slot 210 in the support block 212.

Figure 22:
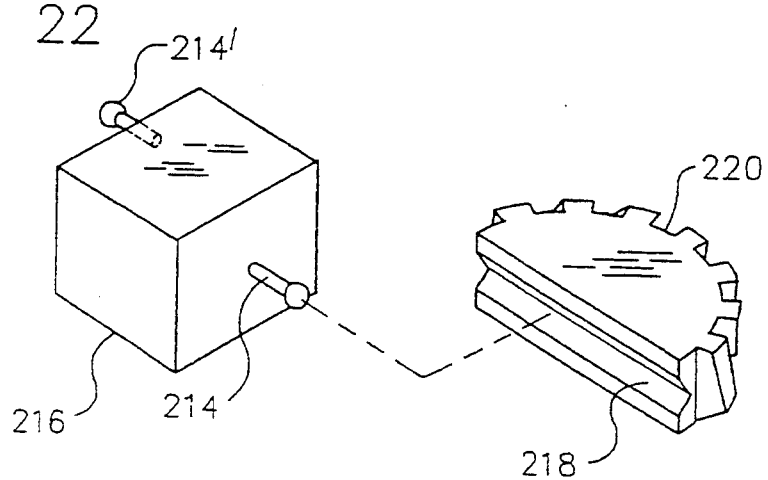
FIG. 22 is a split isometric view showing another embodiment of the present invention showing a pair of pivot ball and pins extending from a support block, either of which may be inserted into a V-shaped slot in a selected master gear segment.

FIG. 22 is a split isometric view showing another embodiment of the present invention showing a pair of connection means 214 and 214' extending from a support block 216, either of which may be inserted into a preferably V-shaped slot 218 in a selected master gear segment 220.

With respect to the earlier mentioned criteria for a selected master gear segment to be finished to a gear class of standard industrial acceptance, it is common in the United States to finish gears and class them according to the standards provided by the American Gear Manufacturing Association, or AGMA. Their standards publication, the "THE GEAR HANDBOOK," may be obtained from the American Gear Manufacturers Association, 1901 North Fort Meyer Drive, Arlington, Va. 22209, United States of America. The reader should refer to those standards for reference. However, it should be recognized that the apparatus and method of the present invention are entirely suitable for use regardless of the classification system employed, and this apparatus and method provides results suitable for making quality control decisions under other gear standards in use around the world. For reference, one standard AGMA table, identifying gear quality classifications by lead tolerance limits, is included as Table I. That table was extracted from the AGMA handbook on unassembled gears, Volume 1, Gear Classifications, Materials and Inspections (AGMA 390.03).

The lead tolerance method of determination of acceptability of a selected gear being inspected is particularly attractive for use with the present invention. By way of use of a table of lead tolerance such as that provided in Table I, the need for complex mathematical calculations is avoided. Although it will undoubtedly be familiar to those of skill in the art, by way of explanation, lead tolerance refers to the amount of allowable deviation from a specified dimensional requirement of a manufactured gear. In essence, the lead is the dimensional change in location of a gear tooth over a certain face width compared to an initial datum location, normally a first face of a gear. The allowable lead tolerance is the amount of distance that a gear tooth may vary, plus or minus, from the specified dimensional requirement at that face width, and still be allowable for service requiring gear quality within an identified gear classification.

TABLE I

American Gear Manufacturing Association
Classification for Gears
-Course Pitch, Spur, Helical and Herringbone Gear

| AGMA Quality Class Number | Lead Tolerances Face Width in Centimeters (Inches) | | | | |
| --- | --- | --- | --- | --- | --- |
| | 2.54 to 5.98 (1 to 2) | 5.08 (2) | 7.62 (3) | 10.16 (4) | 12.7 (5) |
| | Lead Tolerances in Ten Thousands of a Centimeter (Inch) | | | | |
| 8 | 12.7 (5) | 20.32 (8) | 27.94 (11) | 33.02 (13) | 40.64 (16) |
| 9 | 10.16 (4) | 17.78 (7) | 22.86 (9) | 27.94 (11) | 33.02 (13) |
| 10 | 7.62 (3) | 12.7 (5) | 17.78 (7) | 22.86 (9) | 25.40 (10) |
| 11 | 7.62 (3) | 10.16 (4) | 15.24 (6) | 17.78 (7) | 20.32 (8) |
| 12 | 5.08 (2) | 7.62 (3) | 12.7 (5) | 15.24 (6) | 17.78 (7) |
| 13 | 5.08 (2) | 7.62 (3) | 10.16 (4) | 10.16 (4) | 12.7 (5) |

TABLE I-continued

American Gear Manufacturing Association
Classification for Gears
Course Pitch, Spur, Helical and Herringbone Gear

| AGMA Quality Class Number | | | | | |
|---|---|---|---|---|---|
| 14 | 2.54 (1) | 5.08 (2) | 7.62 (3) | 10.16 (4) | 10.16 (4) |
| 15 | 2.54 (1) | 5.08 (2) | 7.62 (3) | 7.62 (3) | 7.62 (3) |

EXAMPLES

Specific examples of the application of the apparatus and method of the present invention for inspection of gears will now be presented. It should be understood that these examples are not intended to limit the present invention in any way, but only to provide examples as to how my method for inspection of gears and my novel apparatus described herein may be utilized.

EXAMPLE I

A 12.7 cm (five (5) inch) pitch diameter gear of 2.54 cm (one (1) inch) face width that was to be manufactured to AGMA class 9 specifications was measured at four positions in steps of 90° of arc around the circumference of the gear. At all four positions, a height differential or delta $H_D$ between a first and second end of a master gear measuring surface, was measured of 0.00762 cm (0.003"). Where a master gear segment of 5.08 cm (two (2) inches) length is utilized, the total delta $H_D$ observed as set forth in the illustration of FIG. 4 above must be halved to provide for a measurement of delta $H_{\overline{D}}$ per 2.54 cm (one (1) inch) of face length. Therefore, 0.00762 cm (0.003") divided by two equals 0.00381 cm (0.0015") deviation per 2.54 cm (one (1)inch) of face width. Since some AGMA specifications as shown in Table 1 allow only a lead tolerance of 10.16/10,000ths of a centimeter per 2.54 om of gear face [4/10,000ths (0.0004) of an inch per inch of gear face], the measured gear is out of specification and is unsuitable for AGMA class 9 service.

In some cases, it may be necessary to convert the deviation to degrees, minutes, and seconds of helical angle deviation. This is easily accomplished since in the arrangement first depicted in FIG. 4, the measurement of delta $H_D$ divided by the length of the master gear segment equals the sine of the helical angle deviation. Here, 0.00762 cm (0.003") divided by 5.08 cm (2") results in a tangent of 0.0015. By inspecting a table of trigonometric functions, it is easily determined that the above described measurement corresponds to 0 degrees, 5 minutes, 10.3448 seconds of helical angle deviation. Thus, even though by use of the lead tolerance method it is unnecessary to perform calculations other than to divide the measured height differential by gear segment length to obtain a lead variation measurement per unit of face width, the actual helical angle variation can also be easily computed.

EXAMPLE II

Another gear to be manufactured to the specifications of set forth in Example I above was measured at four positions in steps of 90° of arc around the circumference of the gear. Height differential measurements at each measurement point varied, ranging from 0.00254 cm (0.001") to 0.0127 cm (0.005"), for a master gear segment of 5.08 cm (2") length. The variance indicates that the gear was wobbling as it was being cut.

By first reducing the observed measurements to distance per unit of face length by dividing the measured height differential by the length of the master gear segment, a lead variance is determined to be from 0.00127 cm (0.0005") to 0.00635 cm (0.0025"). From Table I, the maximum lead tolerance for an AGMA class 9 gear of 2.54 cm (1") face width is 0.001016 cm (0.0004"). Therefore, this gear is unacceptable for class 9 service. If necessary, the helical angle deviation can be computed, which in this case is 0 degrees, 8 minutes, 35.1724 seconds.

EXAMPLE III

Specifications require the manufacture of a helical gear with a four inch long working face having an AGMA Class 13 service rating. Measurements of the manufactured gear are taken along a single tooth, sequentially at positions spaced apart one inch along the working face. The gear and/or the master gear segment are moved as necessary to accomplish the inspection. Such measurements may be accomplished in a fashion similar to that described with regard to FIGS. 7 through 12 above. Readings of height differential delta $H_D$ across the measuring surface of the selected master gear segment are as follows:

| Location | Measurement | |
|---|---|---|
| Base: | 0.0000 cm | (0.0000") |
| 2.54 cm (1"): | 0.00025 cm | (0.0001") |
| 5.08 cm (2"): | 0.00203 cm | (0.0008") |
| 7.62 cm (3"); | 0.00330 cm | (0.0013") |
| 10.16 cm (4"): | 0.0000 cm | (0.0000") |

The AGMA specifications allow a maximum lead tolerance for the Class 13 gear of 10.16 cm (4") face width of 0.001016 cm (0.0004"). The produced gear has a measured lead variance of 0.00165 cm (0.00065") at the 7.62 cm (3") position. Therefore, this gear is unacceptable for service above AGMA Class 11.

The alert machinist will recognize upon inspection of the gear by the just described method that in this example there is presented a manufacturing problem which should be corrected. Specifically, the gear may have slipped in the hob arbor while being manufactured, a sheer pin to the lead screw on the hob may be loose, the lead screw adjustment may have slipped, the thrust bearing on the hobbing machine may be worn, or some other unacceptable condition may exist. Early detection will enable the operator to correct the condition promptly.

To efficiently accomplish the present method in various manufacturing environments, it can be seen that it would be advantageous to collect a set of selected master gear segments, complementary to the various gears being produced in the facility. Then, whenever gear inspection is desired, the proper selected master gear segment may be taken from the set to the inspection station and utilized according the the method of the present invention. A set of master gear segments, with an interchangeable support block, can become a useful set of inspection tools, allowing easy inspection of various gears. It can be seen that as the present invention is utilized and adopted in the machining industry, a master gear segment set may become as useful and indispensable to machinists as the currently employed gage block sets utilized for measurement.

Those skilled in the art will appreciate from the foregoing description that there has herein been disclosed an exemplary gear measurement device which permits the simple and effective measurement of gear errors in such a manner that the necessity for expensive equipment to detect and measure helical angle deviation is not required. Moreover, the provision of a gear measuring device having two axes of rotation wherein both helical angle deviation and taper variation can be measured serves not only to increase the reduce gear inspection costs, but, more significantly, puts a reliable quality control tool in the hands of machinists on the shop floor to vastly improve quality control and quality assurance in the gear manufacturing industry.

Of course, those skilled in the art will appreciate that various modifications can be made to the exemplary gear inspection apparatus and method without departing from the spirit and scope of the invention as described herein. For example, while the examples shown in the various FIGS. 2, 5, 13, etc., show the measurements being conducted in an essentially horizontal fashion, it will be understood that the present invention has herein been described in connection with "relative" movement between the workpiece gear being inspected, the gear inspection apparatus, and the measurement equipment, e.g., in some instances the workpiece gear may be affixed vertically by mounting in a horizontal shaft mounted in positioning apparatus such as shown in FIG. 13. and, consequently, the movement of the selected master gear segment and the required measurements will be in a vertical direction. With more sophisticated mounting equipment, the workpiece gear being inspected may be free to move and the selected master gear segment be fixed, in which case the above described measurements can by easily be conducted along workpiece sections of known length, with similar calculations providing the result achieved by the simpler approach described above.

Therefore, it will be understood that the foregoing description of representative embodiments of the invention have been presented only for purposes of illustration and description and for providing an understanding of the invention. It is not intended to be exhaustive or to limit the invention to the precise forms disclosed. On the contrary, the intention is to cover all modifications, equivalents, and alternatives falling within the spirit and scope of the invention as expressed in the appended claims. It is therefore intended that the scope of the invention be defined by the appended claims rather than by the foregoing description; and all changes which come within the meaning and range of equivalency of the claims are therefore intended to be embraced therein. And, of course, while the invention has herein been described and illustrated in connection with an exemplary "portable" gear inspection apparatus and method, the apparatus need not be "portable," but can constitute a fixed location inspection apparatus to which material to be inspected can be brought.

What is claimed is:

1. An apparatus for measurement of gear errors in a measured gear having a first meshing gear face, without the necessity for rotation of said measured gear about its axis, said apparatus comprising:
   (a) a selected master gear segment,
   (b) a support structure for supporting said selected master gear segment,
   (c) a connection means disposed to operably join said gear segment and said support structure, said connection means arranged to provide at least a first axis of rotation of said master gear segment relative to said support structure, said first axis of rotation being perpendicular to the meshing gear face of said measured gear,
   (d) a gage means for measuring a displacement of the selected master gear segment with respect to the first axis of rotation when said selected master gear segment comes into meshing contact with said measured gear
   (e) whereby upon meshing engagement of said selected master gear segment with said measured gear, while said measured gear is held in a fixed position, said master gear segment may be displaced by rotation about said first axis to a final meshing engagement position, and wherein said displacement may be measured by said gage means and is indicative of the deviation of said measured gear as compared to a gear without error, so that by measurement of said displacement of said master gear segment about said axis, the error of said measured gear may be determined.

2. The apparatus as set forth in claim 1, wherein said selected master gear segment further comprises a second meshing gear face having a center of contact for meshing with a measured gear, and a measuring surface, and wherein said measuring surface includes a first end and a second end spaced apart a preselected distance and a center corresponding to said center of contact for meshing, and wherein said measuring surface is oriented to rotate, at said center, about said first axis of rotation with said master gear segment.

3. The apparatus set forth in claim 2, wherein said measuring surface further comprises a third end and a fourth end spaced apart a preselected distance, and wherein said measuring surface orientation is perpendicular to a second axis of rotation of said master gear segment.

4. The apparatus as set forth in claim 1, wherein said gear segment has a preselected pitch, tooth angle, and classification to a known industrial standard.

5. The apparatus as set forth in claim 1, wherein said connection means comprises a pivot pin protruding from said support structure, and wherein said selected master gear segment further comprises a housing having a chamber located therein, said chamber having an inside dimension slightly larger than the outside dimension of said pivot pin, said chamber being configured to receive said pivot pin with a minimum of clearance so as to allow said gear segment to rotate about an axis provided by said pivot pin.

6. The apparatus as set forth in claim 5, wherein said connection means further comprises a two axis type joint, whereby said gear segment may move along two axes of rotation in relation to said support structure.

7. The apparatus as set forth in claim 6, wherein said joint is a ball and socket type joint.

8. The apparatus as set forth in claim 6, wherein said connection means comprises a pivot pin and a ball.

9. The apparatus as set forth in claim 5, wherein said selected master gear segment further comprises a connection means including a two axis type joint for rotatably securing said support structure to said gear segment in a manner allowing movement between said gear segment and said support structure in two axes of rotation.

10. The apparatus as set forth in claim 1, wherein said connection means comprises a pivot pin protruding from said selected master gear segment, and where said selected support structure further comprises a housing having a chamber located therein, said chamber having an inside dimension slightly larger than the outside dimension of said pivot pin, said chamber being configured to receive said pivot pin with a minimum of clearance so as to allow said gear segment to rotate about an axis provided by said pivot pin.

11. The apparatus as set forth in claim 1, wherein said support structure is a polyhedron, said polyhedron having a plurality of base planes.

12. The apparatus as set forth in claim 11, wherein said connection means is arranged in a manner that when said polyhedron is turned from a first base plane to a second base plane, said pivot pin is relocated from a first position to a second position, whereby a measured gear having a long face can be measured at two or more positions without the necessity of repositioning said master gear.

13. The apparatus as set forth in claim 1, wherein said apparatus is of a size considered portable, so that said apparatus may be hand carried in the briefcase of a workman.

14. The apparatus as set forth in claim 1, wherein said support structure is a parallelpiped, said parallelpiped further including a vertical dimension to define a top and a bottom, a horizontal dimension to define a left side and a right side, and a length to define a front and a back, where said vertical dimension and said horizontal dimension are approximately one and one/half inches each, and wherein said parallelpiped has a length of approximately one and one half inches or more.

15. Apparatus as set forth in claim 14, wherein said connection means is located in an offset position.

16. Apparatus as set forth in claim 15, wherein said connection means is located $\frac{3}{4}$ inches from said bottom and $\frac{1}{2}$ inches from said left side of said parallelepiped.

* * * * *